Figure 1:
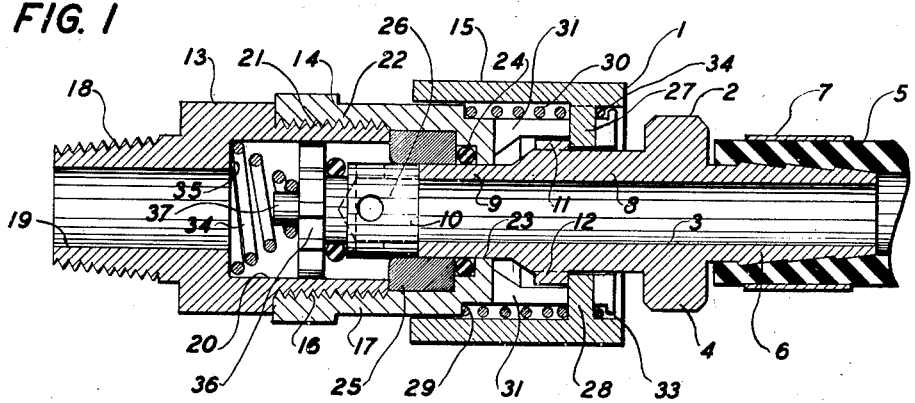

Jan. 18, 1949.  J. VAN SCHUYVER  2,459,477
VALVE COUPLING
Filed Feb. 5, 1946

INVENTOR.
JOHN VAN SCHUYVER
BY
Earl E Moore
ATTORNEY

Patented Jan. 18, 1949

2,459,477

UNITED STATES PATENT OFFICE 2,459,477

VALVE COUPLING

John Van Schuyver, Los Angeles, Calif.

Application February 5, 1946, Serial No. 645,567

2 Claims. (Cl. 284—18)

This invention relates to valved coupling means and ways for making rapid and fluid-tight connections between the ends of a pair of pipes, tubes, hoses, or other similar types and kinds of equipment, or between a pipe, tube, or hose and the outlet end of a spigot, spout, or hydrant and the like. The screw and push type of coupling devices employed today are not entirely satisfactory in that a perfect high pressure fluid-tight breakable joint is not always possible, and the means of making the attachment involves too much twisting and turning or great manual force in order to make a good fluid-tight connection.

The invention herein disclosed is believed to eliminate all the unpleasantness and awkwardness of making the old type of hose connection to hydrants and/or another length of hose; this invention being especially adaptable to high pressure lines and to fluid conductors that are in inconvenient places or so situated that the usual screw type coupling cannot be easily manipulated to make a good fluid-tight connection.

One of the principal objects of this invention is to present a new and novel coupling or connector device which is strong, sturdy and simple in construction, easy to handle and use, and which is economical to make and manufacture.

Another object is to provide a coupling with simple push and short twist means of operation in order to join the parts thereof together and to make connection between a pair of pipes, tubes, or hoses, and likewise a simple twist and push only being required to uncouple the things connected.

Other objects, advantages and features of my invention will appear from the accompanying drawings, the subjoined detailed description, the preamble of these specifications and the appended claims.

Figure 2:
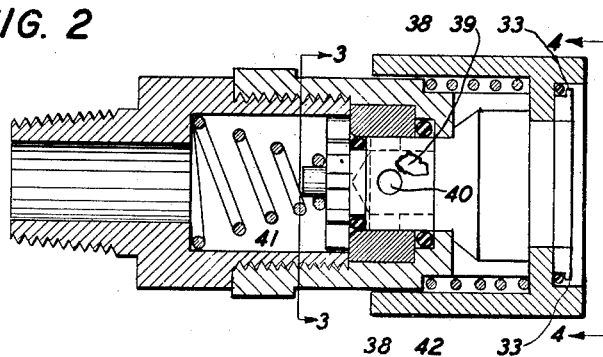
Figure 3:
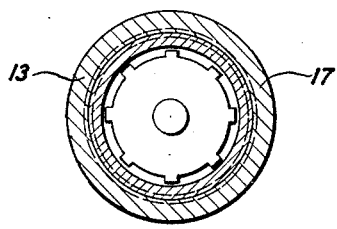
Figure 4:
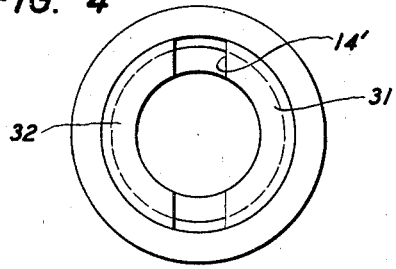
Figure 5:
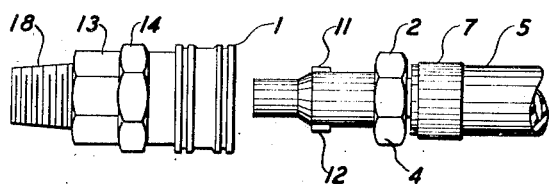

In the drawings:

Fig. 1 is a longitudinal axial sectional view of the device of this invention which is to be employed for coupling or uncoupling things together; this view showing the coupling complete and the valve open, Fig. 2 is a similar sectional view at one end of the device only, the view showing the valve closed as distinguished from the open position of the valve in Fig. 1, Fig. 3 is a transverse sectional view taken substantially along the line 3—3 of Fig. 2, Fig. 4 is an elevational view of one end of the device, and Fig. 5 is an elevational view of one side of the device, and showing the two complementary parts separated, thus presenting a closed valve position in the left hand portion of the parts.

The coupling or/and valve connector device consists of the two principal parts 1 and 2, the outer ends of which are adapted to receive a hose, pipe, end of a spout or hydrant, or any means through which fluid is passed, the broad idea being to connect the ends of two fluid conductors quickly and easily in a hermetically sealed state until purposely disconnected.

The part 2 comprises an elongated element having a central bore 3 and the integral and nut-like grip means 4, this grip means providing a stop for the hose 5. The hose is made fluid tight with the annular ribbed extension 6 by the metal or plastic band 7. Extending from the other side of the grip, there is an annular tube-like projection 8 which merges into a reduced annular tube-like projection 9, the very end of the projection 9 being a plain annular smooth end as indicated at 10. This part of the valve coupling might be called a teat-like element, the insert member, or male member, in that it is inserted into the other part 1 and is provided with integral cleats or dog-like projections 11 and 12 which make a locking connection with the part 1 in a manner to be explained later.

The part 1 includes the three annular casings 13, 14 and 15, the casing 13 being threaded at 16 to engage the threads 17 of the casing 14, as shown. The casing 13, at its outer end, is provided with the tapered threads 18 which are designed to make permanent or semi-permanent fluid-tight connection with pipe or hose, or this end may be provided with a threaded female member to make fluid-tight connection with a spout or hose bib extending from a building or the like. The casing 13 has the fluid passage bore 19 which opens into an enlarged annular chamber 20, the outer surface of this portion of the casing being provided with the threads 21 to receive the threads 22 of the casing 14.

The casing 14 has its end shaped as shown to provide the guide annular edge 23 which snugly but slidably receives the extension 9 of the part 2. The casing 14 has an annular recessed portion to neatly receive the O ring 24 of rubber or "neoprene" which makes a sealing and sliding connection with the extension 9 of the other part 2. The internal wall of casing 14 is provided with an annular recessed portion to accommodate the metal or plastic sleeve or washer 25 which provides a snug track for a shiftable member 26 to be better explained later.

The other casing 15, of the part 1, has inwardly extending fingers 27 and 28, these fingers are locking members, but they cooperate with the annular shoulder 29 of the casing 14 in positioning and limiting the coiled compression spring 30. The casing 14 has a pair of spaced apart projections 31 and 32, each of which has a short upstanding lip 33 which provide shoulder stops for the lock ring 34 that holds the casing 15 in telescoping relation with the casing 14, as shown. It should now be apparent, that the fingers 27 and 28 can slip between the projections 31 and 32 when it is desired to release the casing 15 from the casing 14 or lock the casings together.

Within the chamber 20, there is a helical spring 34 which is confined by the annular shoulder 35 of the casing 13 and the shiftable valve member 36, as shown. The valve member has the projection 37 to accommodate the small end of the spring and it has an annular flange-like portion including a plurality of finger-like projections 38, the outer surfaces of which act as guides for the valve member within the bore of the chamber 20 and the spaces therebetween to provide passages for free fluid flow from one side of the valve member to the other side thereof. Integral with the valve member is the cylindrical extended portion 26 which has a cavity 39 that is open at the end 19 thereof; this cavity, however, having also open connection with a plurality of holes 40, these holes 40 connecting the cavity 39 with the surrounding chamber 20 when the valve member 26 is forced toward the helical spring 34.

There is an annular recessed portion 41 on the valve member which positions an O ring 42 which may be rubber or "neoprene" or made of any other suitable type and kind of material. These O rings form excellent sealing rings for the valve member 26 and prevent fluid passage through the bores 19 and 3 and the chamber 20 when the helical spring forces the valve member 26 entirely into the sleeve 25, obviously the valve member cannot be so forced into the sleeve until the coupling part 2 is removed from the coupling part 1. However, when part 2 is removed, the valve member 26 enters the sleeve 25 so that the holes or ports 40 are closed and the O ring 24 prevents leaks or seepage through or around the valve members.

The coupling part 2 is removed from coupling part 1 by giving part 2 a slight twist after first pressing the casing 15 against its spring 30 so as to open the door or spot 14'; this allows the dog-like projections 11 and 12 to pass through the gap 14' when in register therewith. When the part 2 is connected to part 1, the end thereof need only be forced into the opening of part 1 with the dog-like projection 11 in alinement with the gaps 14' and then given a slight twist so that the projections 11 and 12 will ride along the back portion of lip 33 when again twisted; the casing 15 is not rotatable and its fingers 27 and 28 close the gaps 14' until the casing 15 itself is pressed against its spring 30. Pressing the part 2 into the part 1 opens the valve member 26 in that the end thereof is forced away from the O ring 24 when the end of the part 2 presses against it. In this manner, the valve is automatically opened and fluid permitted to flow from end to end of the coupling unit.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. In a valvular coupling device consisting of a pair of complementary parts, one part comprising a male insert having a passage therethrough from end to end, and the other part comprising a female receiver having a passage therethrough from end to end, the insert having means at one end for making connection with a fluid conductor and the other end adapted to enter the receiver, the end adapted to enter the receiver consisting of a projected teat-like element with spaced radial projected fingers spaced from the ends thereof, the receiver including a body having means at one end for making connection with a fluid conductor, a slidable outer sleeve with inwardly directed fingers at the other end thereof, resilient means for continuously urging the sleeve in a direction away from the other end of the receiver, valve means in the passage of the receiver adapted to be opened by the teat-like end of the insert, spaced axially directed arms extending from the body within the sleeve providing slide-ways between them for the fingers, the distal ends of the arms having inturned flanges, said slide-ways being sized to guide the fingers of the insert and the fingers of the sleeve so that the sleeve can readily reciprocate and the fingers of the insert enter the receiver to be latched behind the flanges of the arms when the sleeve is retracted.

2. In a valvular coupling device consisting of a pair of parts which interfit, one part consisting of a male insert with a bore therethrough and the other part consisting of a female receiver with a bore therethrough, the insert having means at one end for making connection with a fluid conductor and the other end adapted to enter the receiver, the end adapted to enter the receiver consisting of a teat-like element with spaced radial projected fingers spaced from the end thereof, the receiver including a body having means at one end for making connection with a fluid conductor, a slidable sleeve with inwardly directed fingers at the other end thereof, resilient means for continuously urging the sleeve toward the insert, valve means in the passage of the receiver adapted to be shifted by the teat-like end of the insert, a pair of spaced axially directed lipped arms extending from the body within the sleeve providing slide-ways between them, the distal ends of the arms having shoulders on their inner surfaces, said slide-ways being sized to guide the fingers of the insert and the fingers of the sleeve so that the sleeve can shift axially and the fingers of the insert enter the receiver to be latched behind the shoulders when the fingers of the sleeve are retracted.

JOHN VAN SCHUYVER.

REFERENCES CITED

The following references are of record in the file of this patent:

UNITED STATES PATENTS

| Number | Name | Date |
|---|---|---|
| 1,069,146 | Kennedy | Aug. 5, 1913 |
| 1,093,528 | Bowes | Apr. 14, 1914 |
| 1,221,935 | White | Apr. 10, 1917 |
| 1,871,370 | Jacques | Aug. 9, 1932 |
| 2,265,267 | Cowles | Dec. 9, 1941 |
| 2,314,683 | Berry | Mar. 23, 1943 |
| 2,327,611 | Scheiwer | Aug. 24, 1943 |